United States Patent [19]
Whiteford

[11] Patent Number: 6,086,931
[45] Date of Patent: Jul. 11, 2000

[54] SEALED EGG PACKAGE

[76] Inventor: Carlton L. Whiteford, 3 High Point Rd., Westport, Conn. 06880

[21] Appl. No.: 09/363,207

[22] Filed: Jul. 28, 1999

[51] Int. Cl.[7] .............................. A23B 5/00; B65D 81/28; B65D 85/32
[52] U.S. Cl. ................... 426/118; 206/213.1; 206/512.2; 206/521.8; 426/106; 426/119; 426/298; 426/418
[58] Field of Search .............................. 206/521.1, 521.2, 206/521.8, 213.1, 205, 497; 426/298, 300, 118, 106, 108, 115, 418, 392, 395, 119

[56] References Cited

U.S. PATENT DOCUMENTS

| | | | |
|---|---|---|---|
| Re. 28,892 | 7/1976 | Esty | 206/213.1 X |
| 1,868,996 | 7/1932 | Sharp | 426/298 |
| 2,102,886 | 12/1937 | Connor | 426/106 X |
| 3,131,846 | 5/1964 | Whiteford | 206/521.8 |
| 3,257,062 | 6/1966 | Whiteford | 206/521.8 |
| 3,375,966 | 4/1968 | Crabtree | 206/521.1 |
| 3,825,111 | 7/1974 | Pipkins | 206/213.1 |
| 4,282,984 | 8/1981 | Curry, Jr. | 206/497 X |
| 4,573,632 | 3/1986 | Scheeren | 225/657 |
| 4,699,311 | 10/1987 | Wallis | 206/521.2 |
| 5,589,211 | 12/1996 | Cox et al. | 426/298 |
| 5,939,118 | 8/1999 | Cox et al. | 426/298 |

FOREIGN PATENT DOCUMENTS

| | | | |
|---|---|---|---|
| 243282 | 10/1987 | European Pat. Off. | 206/521.8 |

*Primary Examiner*—Bryon P. Gehman
*Attorney, Agent, or Firm*—Spencer E. Olson

[57] ABSTRACT

The sealed egg package disclosed herein includes a cup-shaped receptacle formed of transparent thermoplastic material which encloses and resiliently supports an egg therein. The receptacle is closed by a cover sheet adhesively sealed to the rim of the receptacle. The closed receptacle insulates the egg from the air and inhibits evaporation of water and escape of carbon dioxide from the egg. A gaseous atmosphere such as carbon dioxide, sealed within the receptacle and surrounding the egg protects the egg against deterioration.

12 Claims, 1 Drawing Sheet

SEALED EGG PACKAGE

BACKGROUND OF THE INVENTION

This invention relates to packaging and, more particularly, to packages of perishable articles such as hen's eggs.

It is well known that many foods tend to deteriorate to a greater or less degree in an atmosphere of air. Eggs, for example, are particularly susceptible to the adverse effects of oxygen in the atmosphere and begin to deteriorate immediately upon being laid. Among the factors believed responsible for the deterioration and loss of palatability of eggs are: (1) evaporation of water through the shell; (2) escape of carbon dioxide through the shell, and (3) a change in pH. Carbon dioxide and bicarbonates of sodium and potassium comprise a buffer system within the albumen of the egg. With the loss of carbon dioxide and the resulting reduction in concentration of bicarbonate ions, the buffer system progressively becomes disorganized and the pH of the system tends to rapidly increase from approximately neutral to an alkaline value. It is therefore desirable that the eggs be insulated from the atmosphere as soon as possible after they are laid to protect them from the air and also to prevent escape of moisture and carbon dioxide emitted by the egg.

It is also known that hen's eggs sometimes contain any of various salmonella bacteria, many of which, when ingested, can cause serious disease. A 1998 assessment issued by the Department of Agriculture predicted that one in 20,000 eggs would have salmonella. In recent years, methods have been developed to pasteurize eggs in the shell to eliminate the risk of salmonella. The known methods rely on hot water baths to sterilize an egg without cooking it and deliver an egg said to look, cook and taste the same as an unpasteurized egg. The same result is attainable when hot air is used to sterilize an egg in the shell—after it has been packaged in a sealed container. For this to be done, the package must be able to withstand the temperatures necessary for pasteurization without compromising the seal of the package.

Accordingly, it is an object of the present invention to provide a novel and economical package for eggs which reduces their tendency to deteriorate.

Another object is to provide such a package which protects the contained eggs against damage from normal impacts.

Still another object is to provide such a package which permits visual inspection of the contents without opening the package.

Another object is to provide an egg pack wherein a plurality of eggs are effectively individually packaged so that one or more eggs may be removed without destroying the protection of the remaining eggs.

Another object is to provide such a package which has a relatively large display area on which to print a description of the contents.

Still another object is to provide such a package which will allow it to be subjected to hot air at a temperature sufficient to sterilize a contained egg without cooking it.

SUMMARY OF THE INVENTION

The foregoing and related objects are attained in a sealed package which includes, for each egg, a cup-shaped receptacle of transparent thermoplastic material enclosing an egg. The closed bottom of the receptacle includes a resilient seat for supporting the small end of the egg, and the cup wall is corrugated to allow some expansion so as to firmly grasp and cushion a range of sizes of eggs inserted in the cup, small-end down. The package is closed with a peelable flat cover sheet hermetically sealed to an annular flange surrounding the rim of the receptacle. The sealed package protects the egg from the adverse effects of the atmosphere and at the same time inhibits evaporation of water and escape of carbon dioxide from the egg. A gas in the receptacle surrounds the egg and preferably contains an inert gas preventing deterioration of the egg. To contain the gaseous atmosphere, particularly any carbon dioxide escaping from the egg, the materials of the package are substantially impermeable to carbon dioxide.

A pack of individually sealed eggs may be formed by grouping a number of receptacles, say, six, in a desired array and then sealing all with an integral cover sheet which is shaped and dimensioned to overlay the array. The cover sheet provides a relatively large area on which to display product information, and may be peeled back to open one or more receptacles for removal of an egg or eggs without disturbing adjacent receptacles.

BRIEF DESCRIPTION OF THE DRAWINGS

Other objects, features and advantages of the invention will become apparent, and its construction better understood from the following detailed description taken in conjunction with accompanying drawings, in which.

DESCRIPTION OF THE PREFERRED EMBODIMENT

Figure 1:
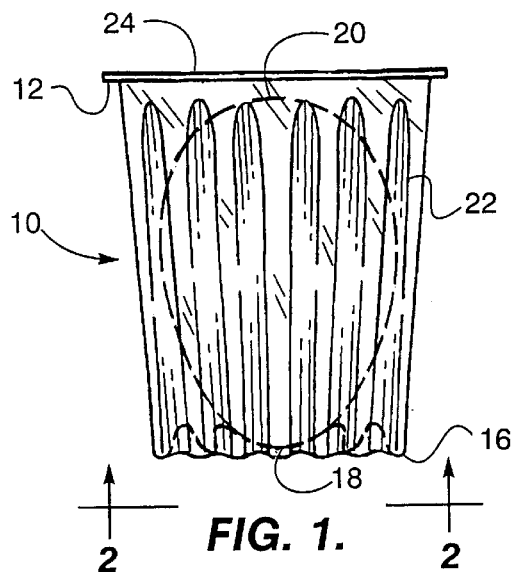
FIG. 1 is a side elevational view of an egg receptacle embodying the invention.
Figure 2:
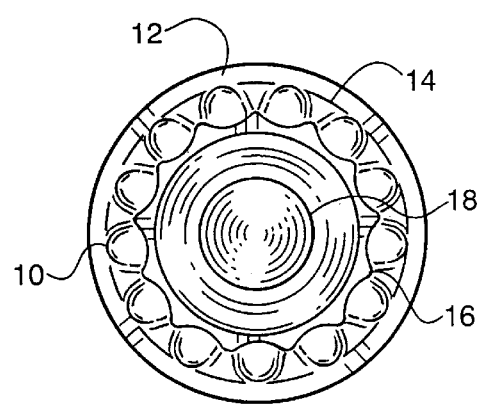
FIG. 2 is a bottom view of the receptacle of FIG. 1.

Referring to FIGS. 1 and 2 of the drawings, the egg package employing the invention includes a cup-shaped receptacle 10 having a straight side wall which tapers downwardly and inwardly from the top rim 14 to a circular base 16. The base extends slightly beyond and surrounds the concave bottom 18 of the cup on which the smaller end of an egg 20 is supported, and which can be made convex by application of thumb pressure to facilitate removal of the egg. The cup wall has a multiplicity of uniformly distributed vertically-oriented corrugations 22 which provide a like multiplicity of inwardly projecting ribs which serve to resiliently hold the egg and eliminate rattling or movement. The lip 14 of the cup is surrounded by an annular flange 12, the function of which will be described presently.

Receptacle 10 is made of a transparent, relatively resilient or flexible thermoplastic material so as to provide suitable cushioning of the egg and to permit the egg 20 to be inspected visually. The material of the receptacle must provide an essentially impermeable barrier to the passage of carbon dioxide, to insure against escape of carbon dioxide and that the egg is protected over the long term. It has been found that polyethylene terephthalate, a relatively inexpensive, transparent, structurally strong thermoplastic material, which may be produced by recycling the soft drink containers of the kind in current use, is particularly suitable. This material is impermeable to carbon dioxide, it can be vacuum formed, and is otherwise suitable for fabrication of the container. Another suitable material is polvinylidene chloride resin.

The upper end of the receptacle is closed with a flat cover sheet 24 having an adhesive on the underside which provides a releasable substantially hermetic seal between the cover sheet and the annular flange 12. The cover sheet may correspond in size with the outside diameter of flange 12 or, alternatively, it may be square or rectangular in shape. It may be made of a gas-impermeable metal foil, and is heat-sealed to flange 12 by an adhesive which will allow the cover sheet to be easily peeled from the receptacle. Alternatively, the cover sheet may comprise aluminum foil laminated to cardboard.

The sealed package protects the egg from the adverse effects of the oxygen-containing atmosphere and at the same time inhibits evaporation of water and escape of carbon-dioxide from the egg.

A gaseous atmosphere within the receptacle surrounds the egg, providing cushioning for the egg and protection against deterioration. The gaseous atmosphere preferably is relatively inert; exemplary of the inert gases which are suitable for packaging eggs are carbon dioxide, nitrogen and helium. Mixtures of such gases have also been found to be suitable. Carbon dioxide is preferred for the packaging of eggs because of its relatively low cost and the fact that it not only inhibits escape of carbon dioxide from the egg, but any carbon dioxide that does escape increases the pressure of the surrounding carbon dioxide so as to prevent further escape.

Although it is considered preferable to eliminate oxygen from the gaseous atmosphere, this may be unnecessary since it has been found that as much as one to two percent of oxygen, and even up to fifteen percent, may be acceptable. Considering the small volume of gaseous atmosphere and that only about 21% of air is oxygen, acceptable results may be obtained using air as the protective atmosphere.

Any suitable method may be used to introduce and seal the gaseous atmosphere in the receptacle, such as placing eggs into respective receptacles in a normal atmosphere, purging substantially all of the air from the receptacles with a stream of the filling gas, carbon dioxide, for example, and then quickly sealing on the cover sheet. Alternatively, the receptacles can be loaded with eggs and then sealed, all within an atmosphere of carbon dioxide, or, other desired gas, or, after loading the receptacles in air, they may be passed into a chamber filled with the selected gas and there sealed.

Figure 3:
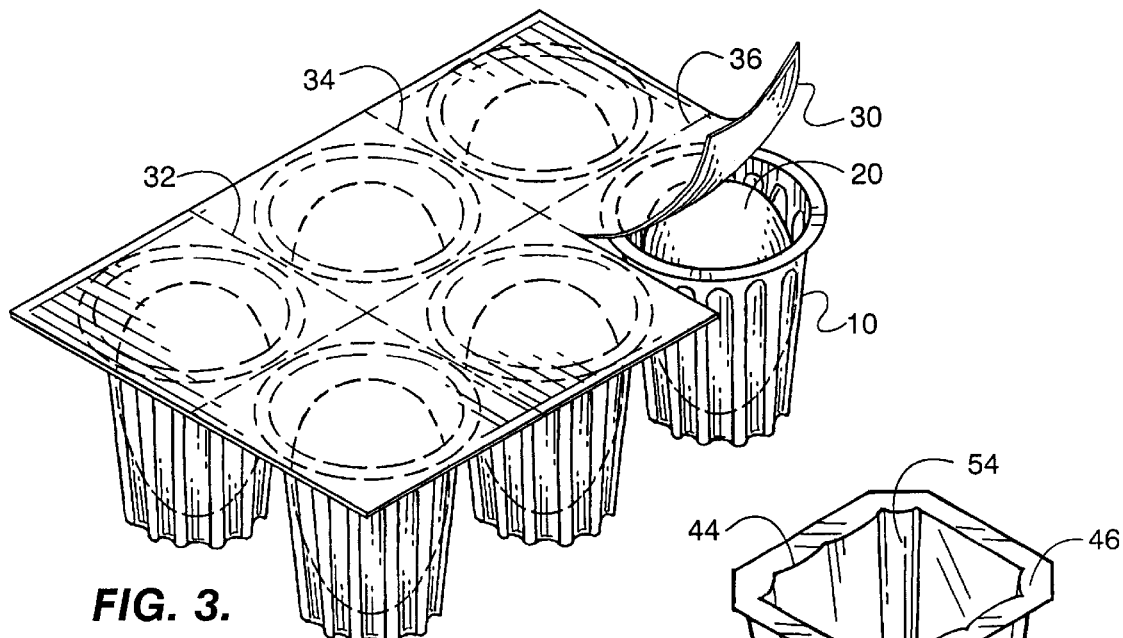
FIG. 3 is a perspective view of an egg pack embodying the invention, wherein one receptacle of a group of six has been opened by removal of a portion of the cover sheet.

The construction of the individual sealed receptacles permits a plurality of them to be grouped, before sealing, in a desired array, and all then sealed with an integral cover sheet to form a pack of individually sealed eggs. FIG. 3 shows an assembly of six receptacles, each corresponding to the receptacle 10 shown in FIG. 1, arrayed in two rows of three. Instead of being individually sealed, all six are hermetically sealed with an integral cover sheet 30 which is shaped and dimensioned to overlay the array of six closely adjacent containers. Thus, the flat cover sheet provides a flat, relatively large display area on which to present, as by printing, information such as brand name, nutritional facts, and the like. The cover sheet may be peeled back as shown to open one or more receptacles for removal of the egg or eggs without disturbing the adjacent receptacles.

If desired, cover sheet 20 may be perforated or scored along dotted lines 32, 34 and 36 for facilitating detachment of single sealed receptacles from the rest.

Figure 4:
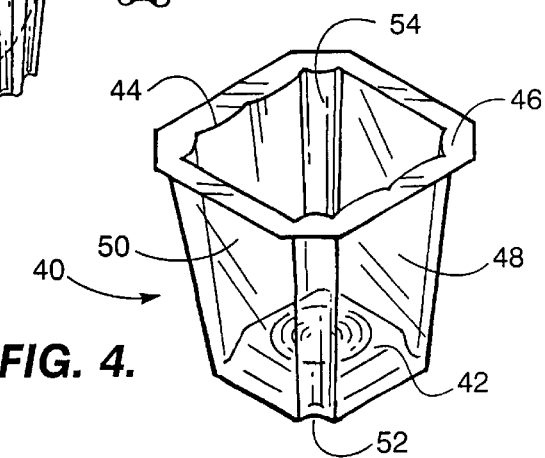
FIG. 4 is a perspective view of an alternative egg receptacle embodying the invention.

While the receptacle 10 construction shown in FIG. 1 is currently preferred, suitable support for the egg is attainable with other designs, one of which is shown in FIG. 4. Receptacle 40 is formed of transparent thermoplastic material, preferably by vacuum forming, is closed at the bottom 42 and has walls tapering upwardly and outwardly from there to a rim 44 at the top, which is surrounded by a flange 46. The receptacle 40 is generally square in cross-section, two sidewalls 48 and 50 of which are visible in FIG. 4, and has four corrugations, one at each corner of the square, two of which are seen at 52 and 54, each providing an inwardly projecting rib which cooperate to engage and resiliently support an egg. Like the FIG. 1 receptacle, it has a concave bottom on which the smaller end of an egg is supported, which can be made convex to facilitate removal of the egg.

It will be evident from the foregoing that the present invention provides an inexpensive package for eggs which insulates the egg from surrounding air and inhibits evaporation of water and escape of carbon dioxide from the egg, and wherein a gaseous atmosphere sealed within the package around the eggs, inhibits the tendency to deteriorate. The package provides a high degree of protection against the shocks the eggs are likely to encounter in handling and shipping the package, and in the case of the "6-Pak" shown in FIG. 3, permits the removal of one or more eggs from the Pak without losing the gaseous atmosphere protecting the remaining eggs.

I claim:

1. A sealed egg package comprising:
   a cup-shaped receptacle formed of transparent thermoplastic material substantially impermeable to carbon dioxide enclosing and resiliently holding therein an egg having a frangible outer shell, said receptacle having a closed bottom and a wall tapering upwardly from said closed bottom to a rim at the top surrounded by an integral outwardly extending flange, said closed bottom including resilient seating means providing cushioned support for said egg and permitting the flow of gas therearound;
   a cover sheet having an adhesive thereon providing peelable, substantially gas-tight engagement between the cover sheet and said flange, the receptacle and cover sheet insulating the egg from the air and inhibiting evaporation of moisture and escape of carbon dioxide from said egg; and
   a gaseous atmosphere sealed within said receptacle surrounding said egg, wherein said gaseous atmosphere includes carbon dioxide released from the egg itself to prevent deterioration of the egg, the transparent receptacle material permitting visual inspection of the contained egg from exterior of the receptacle.

2. A sealed egg package as defined in claim 1, wherein the receptacle material is polyethylene terephthalate.

3. A sealed egg package as defined in claim 1, wherein said gaseous atmosphere further includes an inert gas.

4. A sealed egg package as defined in claim 2, wherein said inert gas is carbon dioxide.

5. A sealed egg package as defined in claim 1, wherein the wall of said receptacle has multiple corrugations distributed therearound providing inwardly projecting ribs to resiliently hold the egg.

6. A sealed egg package as defined in claim 5, wherein said receptacle is circular in cross-section, and wherein said corrugations are uniformly distributed therearound.

7. A sealed egg package as defined in claim 5, wherein said receptacle is generally square in cross-section, and has four corrugations, one at each corner of the square, each providing an inwardly projecting rib.

8. A sealed egg pack comprising:
   a plurality of cup-shaped receptacles formed of transparent thermoplastic material substantially impermeable to carton dioxide each enclosing and resiliently supporting therein an egg having a frangible outer shell, each of said receptacles having a closed bottom, and a wall tapering upwardly and outwardly from said closed bottom to a top rim surrounded by an integral flange, said closed bottom including resilient seating means providing support for said egg and permitting gas to flow therearound;

a cover sheet dimensioned to overlay an array of said plurality of receptacles and having an adhesive thereon providing peelable substantially gas-tight engagement between said cover sheet and the flange of each receptacle while permitting the cover sheet to be selectively and readily peeled from one or more of the receptacles without disturbing adjacent receptacles; and a gaseous atmosphere sealed within each receptacle surrounding the contained egg, wherein said gaseous atmosphere includes carbon dioxide released from the egg itself to prevent deterioration of the egg, the transparent receptacle material permitting visual inspection of the contained eggs without opening the entire pack.

9. A sealed egg pack as defined in claim 8, wherein the receptacle material is polyethylene terephthalate.

10. A sealed egg pack as defined in claim 8, wherein said gaseous atmosphere further includes an inert gas.

11. A sealed egg pack as defined in claim 9, wherein said inert gas is carbon dioxide.

12. A sealed egg package comprising:

a cup-shaped receptacle formed of a transparent thermoplastic material substantially impermeable to carbon dioxide and moisture enclosing a single egg having a frangible outer shell, said receptacle having a wall, a closed bottom and a rim at the top of the wall surrounded by an integral flange, said closed bottom including resilient seating means supporting an end of said egg and said wall having multiple vertical corrugations distributed therearound forming inwardly projecting ribs dimensioned to resiliently engage and hold said egg against rattling or movement and permitting the flow of gas around the egg, the transparent material of said receptacle permitting visual inspection of the contained egg from exterior of the package;

a peelable flat cover sheet hermetically sealed to the flange on said receptacle, the sealed receptacle and cover sheet insulating the egg from surrounding air and inhibiting evaporation of moisture and escape of carbon dioxide from said receptacle; and a gaseous atmosphere sealed within said receptacle and adapted to flow around said egg, said gaseous atmosphere including carbon dioxide, the pressure of which is increased by release of carbon dioxide by the egg itself to prevent deterioration of the egg.

* * * * *